UNITED STATES PATENT OFFICE.

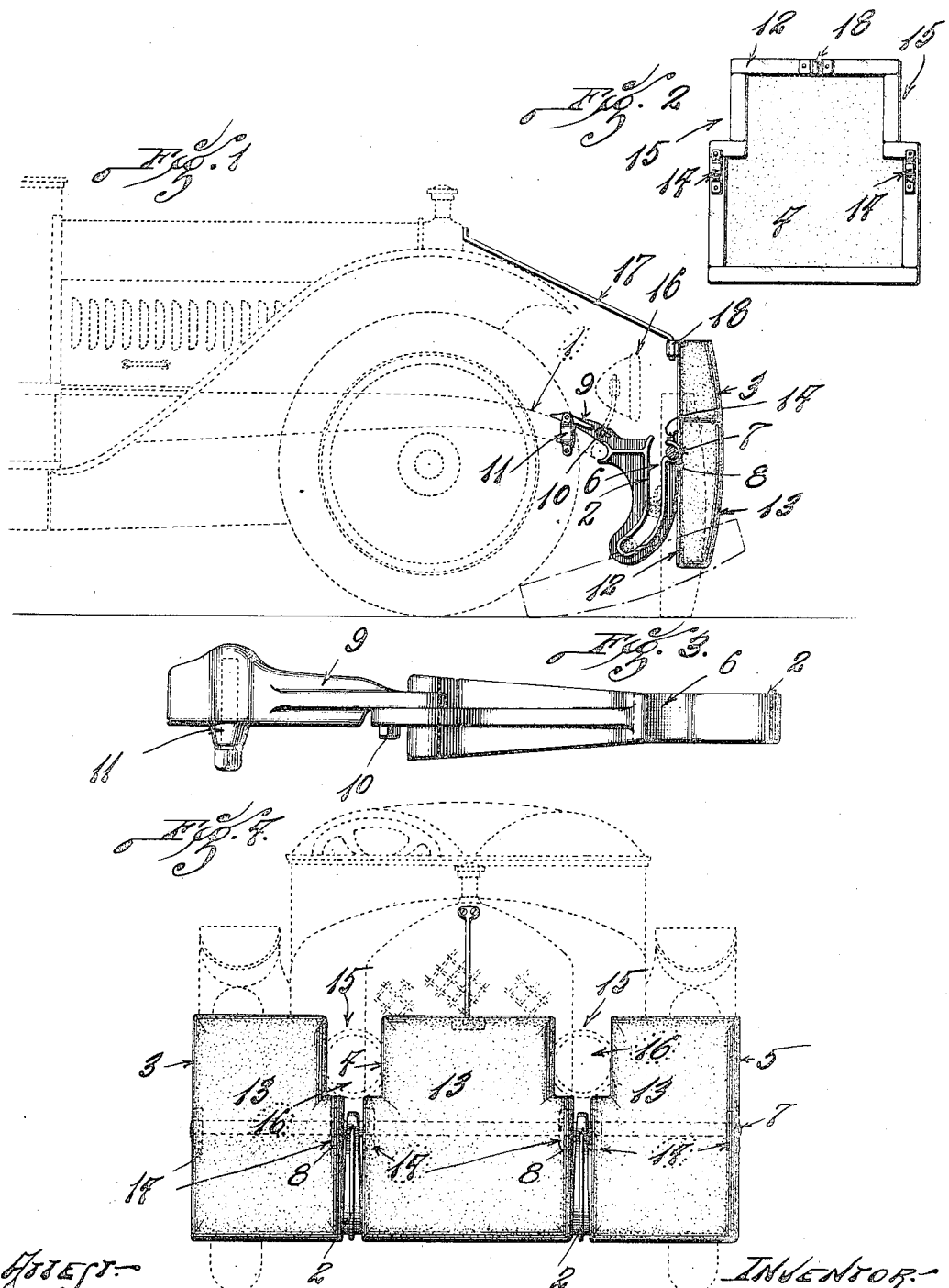

GEORGE L. WHEELER, OF ST. LOUIS, MISSOURI.

AUTOMOBILE AND CAR FENDER.

1,064,948.

Specification of Letters Patent. Patented June 17, 1913.

Application filed September 16, 1912. Serial No. 720,570.

*To all whom it may concern:*

Be it known that I, GEORGE L. WHEELER, a citizen of the United States, and resident of St. Louis, Missouri, have invented certain new and useful Improvements in Automobile and Car Fenders, of which the following is a specification containing a full, clear, and exact description, reference being had to the accompanying drawings, forming a part hereof.

My invention relates to an improved fender for automobiles and street cars, and consists in the novel construction hereinafter described and pointed out in the appended claims.

The object of my invention is to provide an improved "automatic drop" fender for automobiles and street cars which shall be in the form of a soft pad or cushion supported on edge at the front of the vehicle and adapted to receive the initial impact of the pedestrian or other object with which the automobile or street car may accidentally come in contact.

A further object of my invention is to provide an improved fender of the class above described, which shall be automatically dropped into the path of one of the front wheels of the vehicle to block the same when accidentally brought into contact with a pedestrian or other object, whereby the driver of the automobile or street car will be unable to escape after an accident.

In the drawing Figure 1 is a side elevation of my improved fender applied to the front end of an automobile, the latter being shown in dotted lines; Fig. 2 is a rear elevation of one of my "feather bed" pad sections; Fig. 3 is a detail plan view of one of the detachable supporting-brackets used to connect the pad sections to the frame of the vehicle; and Fig. 4 is a front elevation of my improved fender applied to the front end of an automobile, the automobile being shown in dotted lines.

The numeral 1 indicates the front end of the vehicle frame to which is detachably clamped a pair of supporting-brackets 2, which carry a series of separate pad-sections 3, 4 and 5 respectively. The said brackets 2 are provided in their front portions with a vertical slot 6 into which automatically drops the horizontal pad-supporting bar 7 carrying all of said pads, when the pads are accidentally brought into contact with a pedestrian or other object. The upper ends of the slots 6 in said brackets 2 are open so that said supporting bar 7 may be detached whenever it is desired to remove the pad-sections. Formed in the upper ends of the front arms of said brackets 2 are the bar-seats 8 in which the said pad-supporting bar 7 normally rests when the fender is in operative position. The said bar-seats 8 intersect said slots 6 in said brackets. The rear arms of said brackets 2 are provided with rear sections 9 which are hinged to the said rear arms by means of a common set screw 10, and the rear ends of said rear sections 9 are provided with common clamps 11 for securing said rear sections to the vehicle frame. The said pad-sections 3, 4 and 5 are composed of a suitable rectangular rear frame 12 upon the front face of which is secured in any common form soft upholstery 13 of suitable thickness and softness to prevent serious injury when said pad is brought into forcible accidental contact with a pedestrian's body.

Each of the pads 3, 4 and 5 is clamped upon the pad-bar 7, by means of suitable bearings 14 which embrace the pad-bar and are secured to the frame 12 by means of suitable bolts or rivets. The upper portion of each pad is cut away at 15 in order to lighten the upper portion of the pad, as well as to provide an opening between the pads for the passage of rays of light from the headlights 16.

The numeral 17 indicates a brace which has its rear end secured to the automobile radiator, or some other portion of the vehicle, and its front end bent downwardly and loosely mounted in a socket 18 carried by the upper end of the central pad 4, the purpose of said brace being to normally retain the pads, in a vertical or edgewise position, as shown.

The above described manner of mounting the pad-sections results in each section being supported at a point in the rear of its center of gravity, or in other words each pad has a preponderance of weight in advance of its pivotal support.

The operation is as follows: Whenever any one or all of the pads 3, 4 or 5 are accidentally brought into forcible contact with a pedestrian or some object, the said pad or pads will be carried rearwardly a short distance, thereby dislodging the pad-bar 7 from the seats 8 in the brackets 2, when the weight will carry the said pad-bar and pads downwardly, until the lower edge of the pads touches the ground and until the said bar rests in contact with the lower end of the slots 6 in the said brackets, the downward movement of the central pad 4, of course, detaching its socket 18 from the front end of the brace 17. The preponderance of weight of the said pads in front of the bar 7 will tilt the said pads into the position in which they are shown in dotted lines in Fig. 1, and the outer pad, if sufficiently long, will obstruct or clog the front wheel of the vehicle and prevent the driver from escaping from an accident for which he is to blame. During the operation last mentioned the fender itself acts as a brake for the vehicle wheel or wheels, as the wheel or wheels will run upon the lower edge of the fender pads, and it will be impossible for the wheels to turn while thus blocked by such braking action of the fender.

I claim:

1. The improved impact cushion and fender for wheeled vehicles, comprising a suitable fender-supporting bracket provided with means whereby it is adapted to be attached to the vehicle frame, a suitable pad having a soft front impact face, means for temporarily suspending said pad from said bracket in front of the vehicle wheel, means whereby said pad will be automatically dropped to the ground and extended beneath and be run upon by the vehicle wheel and act as a brake to block said wheel whenever said pad accidentally strikes a pedestrian, and suitable means for connecting said pad to said bracket after said pad has been dropped and run upon by the vehicle wheel.

2. The improved impact cushion and fender, comprising a suitable bracket having a pad-supporting seat and arranged to be attached to the front of a vehicle frame, a rectangular body in the form of a large soft pad having a front impact vertical face of a height approximately equal to the diameter of the vehicle front wheels, means for temporarily suspending said pad on edge from said bracket seat in front of the vehicle wheel, suitable means for guiding said pad downwardly and rearwardly from said seat so that said pad will have its lower edge automatically dropped to the ground and extended beneath and be run upon by the vehicle wheel to block the same, and means to retain a practical connection of said pad to said bracket after said pad has been dropped and run upon by said wheel.

3. The improved impact cushion and fender, comprising suitable brackets to be attached to the vehicle frame and having vertical slots curved rearwardly at their lower ends and intersected near their upper ends by bar-seats opening rearwardly into said slots, a supporting-bar normally located in said bar-seats, and an impact body in the form of a large soft cushion temporarily suspended from said supporting-bar in front of the vehicle wheel, and constructed of sufficient size to be automatically dropped to the ground when accidentally brought into contact with a pedestrian and to extend beneath and be run upon by the vehicle wheel to block the same.

4. The combination with a vehicle of a series of impact cushions in the form of wide pads supported abreast of each other at the front of the vehicle with their flat sides in a vertical position and with their lower edges near the ground, in combination with suitable brackets, and means for temporarily suspending said pads so that the lower edge of said pads will be automatically dropped to the ground when any pad is accidentally brought into contact with a pedestrian, and said lower edge will thereupon extend beneath and be run upon by the vehicle wheel to block the same.

In testimony whereof, I have signed my name to this specification, in presence of two subscribing witnesses.

GEORGE L. WHEELER.

Witnesses:
E. L. WALLACE,
JOHN C. HIGDON.